US009560334B2

(12) United States Patent
Ramachandra et al.

(10) Patent No.: US 9,560,334 B2
(45) Date of Patent: Jan. 31, 2017

(54) METHODS AND APPARATUS FOR IMPROVED CROPPING OF A STEREOSCOPIC IMAGE PAIR

(75) Inventors: Vikas Ramachandra, San Diego, CA (US); Kalin Mitkov Atanassov, San Diego, CA (US); Sergiu R. Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 923 days.

(21) Appl. No.: 13/604,395

(22) Filed: Sep. 5, 2012

(65) Prior Publication Data
US 2013/0063572 A1    Mar. 14, 2013

Related U.S. Application Data

(60) Provisional application No. 61/532,480, filed on Sep. 8, 2011.

(51) Int. Cl.
*G06T 7/00* (2006.01)
*H04N 13/00* (2006.01)

(52) U.S. Cl.
CPC ...... *H04N 13/0018* (2013.01); *H04N 13/0022* (2013.01); *H04N 13/0033* (2013.01)

(58) Field of Classification Search
CPC .................................................. H04N 13/0239
USPC ...................................... 348/47, 43; 382/284
See application file for complete search history.

(56) References Cited

U.S. PATENT DOCUMENTS

| 2007/0248260 | A1 | 10/2007 | Pockett |
| 2008/0024596 | A1 | 1/2008 | Li et al. |
| 2008/0112616 | A1 | 5/2008 | Koo et al. |
| 2008/0240549 | A1 | 10/2008 | Koo et al. |
| 2010/0039499 | A1* | 2/2010 | Nomura ............ H04N 13/0022 348/43 |

(Continued)

FOREIGN PATENT DOCUMENTS

| CN | 101184252 A | 5/2008 |
| JP | 2002077947 A | 3/2002 |

(Continued)

OTHER PUBLICATIONS

International Search Report and Written Opinion—PCT/US2012/053893—ISA/EPO—Dec. 20, 2012

*Primary Examiner* — Paulos M Natnael
*Assistant Examiner* — Sihar Karwan
(74) *Attorney, Agent, or Firm* — Knobbe Martens Olson & Bear, LLP

(57) ABSTRACT

Described herein are methods and apparatus to adjust the convergence point of a stereoscopic image pair captured by an imaging device. In one method, a first image and a second image of a stereoscopic image pair are provided, and then shifting or cropping of the first image is performed to align the first and second image. This shifting or cropping is performed while preserving the second image. The method then includes determining a target horizontal image disparity based on a desired convergence point of the stereoscopic image pair and when the target horizontal disparity is greater than a predetermined maximum, the cropping of an outside dimension of the first image is limited. In some implementations it is limited to the predetermined maximum.

22 Claims, 10 Drawing Sheets

(56) References Cited

U.S. PATENT DOCUMENTS

| | | | |
|---|---|---|---|
| 2010/0104217 A1* | 4/2010 | Tsurumi | G06K 9/00335 |
| | | | 382/284 |
| 2011/0001798 A1 | 1/2011 | Cookson et al. | |
| 2011/0074770 A1 | 3/2011 | Robinson et al. | |
| 2011/0142426 A1 | 6/2011 | Sasaki et al. | |
| 2012/0249746 A1* | 10/2012 | Cornog | H04N 13/0022 |
| | | | 348/47 |

FOREIGN PATENT DOCUMENTS

| | | |
|---|---|---|
| JP | 2004129186 A | 4/2004 |
| JP | 2004343290 A | 12/2004 |
| JP | 2011035712 A | 2/2011 |
| KR | 20080043576 A | 5/2008 |
| WO | 2011013030 A1 | 2/2011 |

* cited by examiner

METHODS AND APPARATUS FOR IMPROVED CROPPING OF A STEREOSCOPIC IMAGE PAIR

CROSS-REFERENCE TO RELATED APPLICATIONS

This disclosure claims priority to U.S. Provisional Patent Application No. 61/532,480 filed Sep. 8, 2011, entitled "METHOD AND APPARATUS FOR IMPROVED CROPPING OF A STEREOSCOPIC IMAGE PAIR," and assigned to the assignee hereof. The disclosure of this prior application is considered part of, and is incorporated by reference in, this disclosure.

TECHNICAL FIELD

The present embodiments relate to imaging devices, and in particular, to methods and apparatus for improving the processing of two digital images captured by an imaging device having one or two imaging sensors.

BACKGROUND

In the past decade, digital imaging capabilities have been integrated into a wide range of devices, including digital cameras and mobile phones. Recently, the ability to capture stereoscopic images with these devices has become technically possible. Device manufacturers have responded by introducing devices integrating digital image processing to support this capability, utilizing single or multiple digital imaging sensors. A wide range of electronic devices, including mobile wireless communication devices, personal digital assistants (PDAs), personal music systems, digital cameras, digital recording devices, video conferencing systems, and the like, make use of stereoscopic imaging capabilities to provide a variety of capabilities and features to their users. These include stereoscopic (3D) imaging applications such as 3D photos and videos or movies.

To achieve stereoscopic image pairs that are precisely aligned, devices with a plurality of imaging sensors are often calibrated during the manufacturing process. The device may be placed into a special "calibration mode" on the manufacturing line, with the imaging sensors pointed at a target image designed to assist in clearly identifying each camera's relative position. Each camera of the device may then be focused on the target image and an image captured. Each captured image can then be analyzed to extract the camera's relative orientation.

Some cameras may be designed such that small adjustments to each camera's relative position can be made on the factory floor to better align the positions of the two cameras. For example, each camera may be mounted within an adjustable platform that provides the ability to make small adjustments to its position. Alternatively, the images captured by each camera may be analyzed by image processing software to determine the relative position of each camera to the other. This relative position data is then stored in a non volatile memory on the camera. When the product is later purchased and used, on board image processing utilizes the relative position information to electronically adjust the images captured by each camera to produce high quality stereoscopic images.

These calibration processes have several disadvantages. First, a precise manufacturing calibration consumes time during the manufacturing process, increasing the cost of the device. Second, any calibration data produced during manufacturing is static in nature. As such, it cannot account for changes in camera position as the device is used during its life. For example, the calibration of the multiple lenses may be very precise when the camera is sold, but the camera may be dropped soon after purchase. The shock of the fall may cause the cameras to go out of calibration. Despite this, the user will likely expect the camera to survive the fall and continue to produce high quality stereoscopic images.

Furthermore, expansion and contraction of camera parts with temperature variation may introduce slight changes in the relative position of each camera. Factory calibrations are typically taken at room temperature, with no compensation for variations in lens position with temperature. Therefore, if stereoscopic imaging features are utilized on a particularly cold or hot day, the quality of the stereoscopic image pairs produced by the camera may be affected.

Therefore, a static, factory calibration of a multi camera device has a limited ability to compensate for misalignments. While a periodic calibration would alleviate some of these issues, it may not be realistic to expect a user to perform periodic stereoscopic camera calibration of their camera during its lifetime. Many users have neither the desire nor often the technical skill to successfully complete a calibration procedure.

Furthermore, some devices enable the ability to capture a stereoscopic imaging pair using only one imaging sensor. With these devices, the device may be manually positioned, sometimes with the assistance of automated prompting, to capture the two images. Using this technique, misalignments between images captured as part of the stereoscopic image pair are very common. In these devices, there is no ability for a factory calibration to eliminate misalignments between the stereoscopic image pairs.

Because of persistent misalignment between the images of a stereoscopic image pair, methods have been introduced to provide high quality stereoscopic images from digital image pairs with some moderate misalignment. These methods digitally process the stereoscopic image pairs to produce aligned images. Aligning stereoscopic images may include cropping one or both images to correct for horizontal or vertical shift between the images of a stereoscopic image pair. The two images of a stereoscopic image pair may also be misaligned about a "z" axis, caused when one imaging sensor is slightly closer to a scene being imaged than the other imaging sensor. Cropping may also be required to correct for misalignment due to rotation of the images about a x, y, or z axis. Finally, cropping may also be required to adjust the convergence point of the two images in the stereoscopic image pair. These multiple crop operations may adversely affect the viewable region of the stereoscopic image. The resulting size of the viewable region of the resulting stereoscopic image pair may limit a device's ability to compensate for misaligned stereoscopic image pairs in some imaging environments

SUMMARY

Some of the present embodiments may include a method of adjusting a stereoscopic image pair. The method may comprise providing a first image and a second image that are part of a stereoscopic image pair. The method may further comprise shifting or cropping the first image of the stereoscopic image pair to align the first and second image, while preserving the second image, determining a target horizontal image disparity based on a desired convergence point of the stereoscopic image pair, and limiting the cropping of an outside dimension of the first image to a predetermined threshold when the target horizontal image disparity is greater than the predetermined threshold. Some embodiments of the method may further comprise cropping the outside dimensions of the first and second images by one half the target horizontal image disparity when the target horizontal image disparity is less than or equal to the predetermined threshold. Other embodiments may crop the outside dimension of the second image by at least the target horizontal image disparity when the target horizontal image disparity is greater than the predetermined threshold. Some embodiments may also include cropping the first image or the second image to achieve a target dimension. In some embodiments, the first image is captured through a first image sensor and the second image is captured through a second image sensor. In some embodiments, the first image sensor and the second image sensor are the same image sensor. In some embodiments, the aligning of the first image and the second image includes geometrically rotating the first image. In other embodiments, the method further comprises storing the rectified first and second images to a data store. In some embodiments, the predetermined threshold is eight percent of a horizontal image resolution.

Other present embodiments may include an imaging device including a first imaging sensor, a second imaging sensor, an electronic processor coupled to the first imaging sensor and the second imaging sensor, and a control module configured to capture a first image of the stereoscopic image pair with the first image sensor, capture a second image of the stereoscopic image pair with the second image sensor, shift or crop the first image to align the first and second image, while preserving the second image, determine a target horizontal image disparity based on a desired convergence point of the stereoscopic image pair, and adjust the stereoscopic image pair by limiting the cropping of the outside dimension of the first image to a predetermined threshold when the target horizontal image disparity is greater than the predetermined threshold. In some embodiments, the control module is further configured to adjust the stereoscopic image pair by preserving the inside dimension of the first image when the target horizontal image disparity is greater than the predetermined threshold. In other embodiments, the control module may be further configured to adjust the stereoscopic image pair by cropping the second image to affect the target horizontal disparity between the second image and the first image. In still other embodiments, the control module may be further configured to crop the outside dimensions of the first and second images by at least one half the target horizontal image disparity when the target horizontal image disparity is less than or equal to the predetermined threshold. In some embodiments, the outside dimension of the second image is cropped by at least the target horizontal image disparity when the target horizontal image disparity is greater than the predetermined threshold. In some embodiments, the control module is further configured to crop at least one image derived from the second image or the first image to achieve a target dimension. In other embodiments, the aligning of the first image and the second image includes geometrically rotating the first image.

In some embodiments, the control module is also configured to store a stereoscopic image pair derived from the first image and the second image to a data store. In some embodiments, the predetermined threshold is equivalent to eight percent of the horizontal image resolution. Still other embodiments of the apparatus further comprise a wireless telephone handset.

Another innovative aspect disclosed is an apparatus for adjusting a stereoscopic image pair. The apparatus includes a means for providing a first image and a second image that are part of a stereoscopic image pair, means for shifting or cropping the first image to align the first and second image, while preserving the second image, means for determining a target horizontal disparity based on a desired convergence point of the stereoscopic image pair, and means for adjusting a stereoscopic image pair to obtain the desired convergence point by limiting the cropping of an outside dimension of the first image to a predetermined threshold when the target horizontal disparity is greater than the predetermined threshold.

Other present embodiments may include a non-transitory computer readable medium containing processor executable instructions that are operative to cause a processor to perform a method of adjusting a convergence point of a stereoscopic image pair the method including capturing a first image of a stereoscopic image pair with an image sensor, capturing a second image of the stereoscopic image pair with an image sensor, shifting or cropping the first image to align the first and second image, while preserving the second image; determining a target horizontal image disparity based on a desired convergence point of the stereoscopic image pair, and limiting the cropping of an outside dimension of the first image to the predetermined threshold when the target horizontal image disparity is greater than the predetermined threshold.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
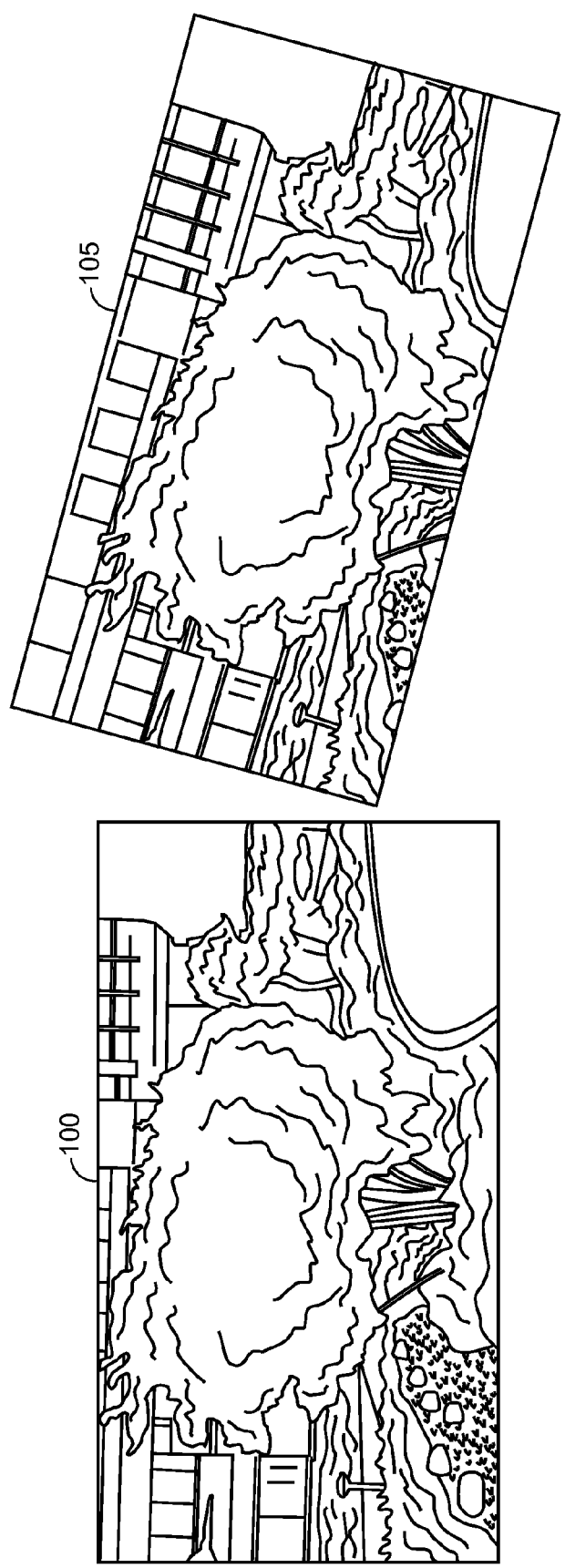
FIG. 1 illustrates two misaligned images included in a stereoscopic image pair.

Implementations disclosed herein provide systems, methods and apparatus for generating a stereoscopic image with an electronic device having one or more imaging sensors. Some embodiments include determining a vertical disparity between two images captured by the imaging sensors, correcting the vertical disparity by generating at least one corrected image, and generating a stereoscopic image pair based on the corrected image.

The present embodiments further contemplate displaying the stereoscopic image pair on a display screen. One skilled in the art will recognize that these embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The relative positions of the multiple cameras of a stereoscopic imaging device can be described by three axis of angular movement and three axis of shift. For purposes of this discussion, positions on a x, y, and z axis describe relative shift. Angular rotational can be described by rotations about a horizontal (x) axis, also called "pitch", vertical (y) axis, known as "yaw", and (z) axis or "roll."

Variations in the relative position of multiple sensors across one axis can affect stereoscopic image quality more significantly than variations across another axis. For example, psychophysical tests confirm that shift along the y axis, or a variation in pitch angle, have the greatest effect on perceived image quality. These shifts along the y axis or pitch angle are known in the art as vertical disparity. Vertical disparity may cause nausea or headaches when viewed over a prolonged period, as is the case for example, when viewing stereoscopic videos or movies.

While vertical disparity has a particular impact on stereoscopic image pair quality, the other forms of misalignment mentioned above will also be noticed by viewers and affect their overall perception of the image quality. Therefore, embodiments relate to imaging devices that digitally correct the alignment of images about all six axes described above before a stereoscopic image pair is viewed. To correct for misalignments about these six axes, stereoscopic imaging devices can shift and/or crop the stereoscopic image pairs to adjust the alignment of the two images. To minimize the loss of data from an individual image, both images may be digitally cropped as part of the alignment process.

While correcting misalignments between images may be part of the digital processing performed before displaying a stereoscopic imaging pair to a user, other adjustments to the images may also be needed. For example, stereoscopic image pairs may be adjusted to achieve a particular convergence point. The convergence point of a stereoscopic image pair determines at what depth each object in the stereoscopic image is perceived by a viewer. Objects with zero offset between the two images when the two images are displayed are said to be at zero parallax, and thus are perceived at screen depth. Objects with positive parallax are perceived at greater than screen depth while objects with negative parallax are perceived as in front of the screen.

However, there is ultimately a limited amount of image data that can be removed from each image of a stereoscopic image pair without adversely effecting image quality. This limited amount of image data is known as a total crop "budget." The total crop budget corresponds to the amount of image data available along one dimension of an image that can be removed during cropping operations that align images (a "crop budget") and set an appropriate convergence point (a "convergence budget").

FIG. 1 illustrates two misaligned images 100 and 105 included in a stereoscopic image pair. A stereoscopic image pair may be misaligned for a variety of reasons. For example, the relative position of multiple lenses used to capture a stereoscopic image pair may differ from the design specifications of the imaging device used to capture the images. This variance in lens position may result in one image being shifted relative to an x, y, or z axis relative to the other lens. A lens or image sensor may also be rotated about an x, y, or z axis relative to another lens or image sensor. Some devices include calibration procedures that are performed during manufacturing or later that function to minimize the effects of mechanical variations in lens positions. Other devices may include image processing capabilities to adjust images digitally after image capture to compensate for any physical misalignment of the lenses or imaging sensors.

For illustration purposes, image 105 of FIG. 1 is shown with an exaggerated misalignment when compared to image 100. Image 105 is positioned above image 100 and has been rotated in a clockwise direction relative to image 100. Before these two images can be displayed to a user and provide a satisfactory stereoscopic viewing experience, images 100 and 105 must be aligned. Some embodiments may also adjust the convergence point of the two images before they are displayed so that the images are presented with the right stereoscopic perspective.

Figure 2A:
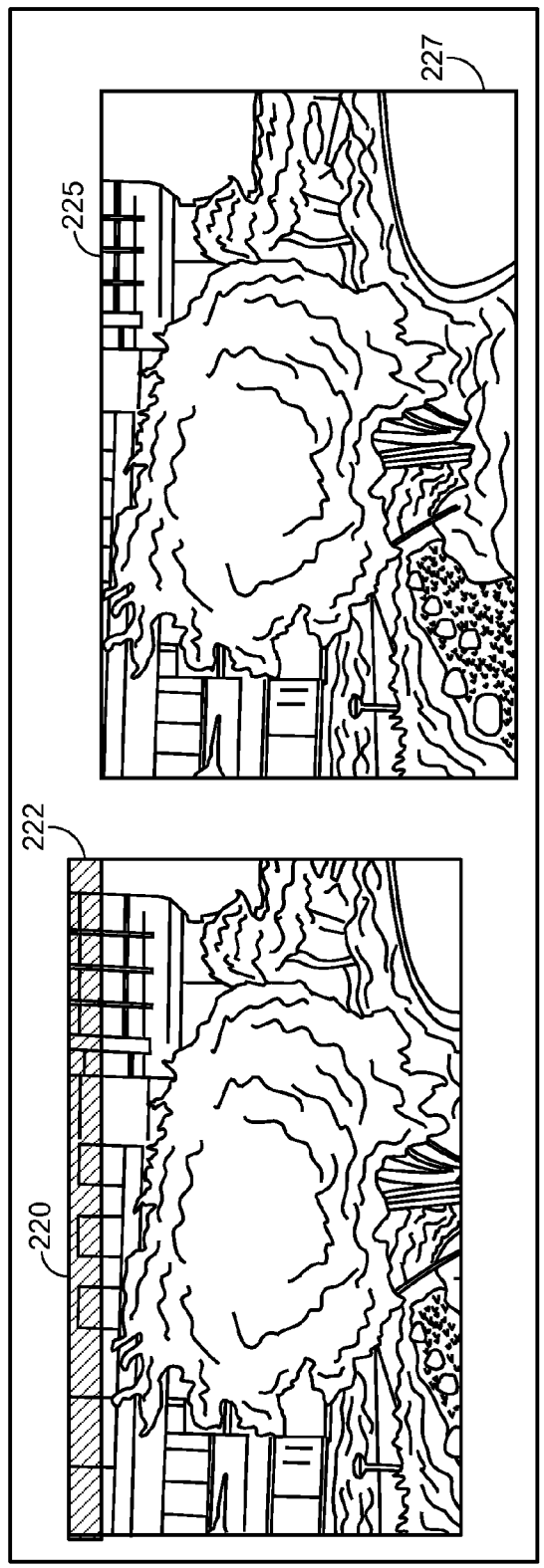
FIGS. 2A and 2B show stereoscopic image pairs and illustrate how the image pair from FIG. 1 is corrected after the rotation of one image
Figure 2B:
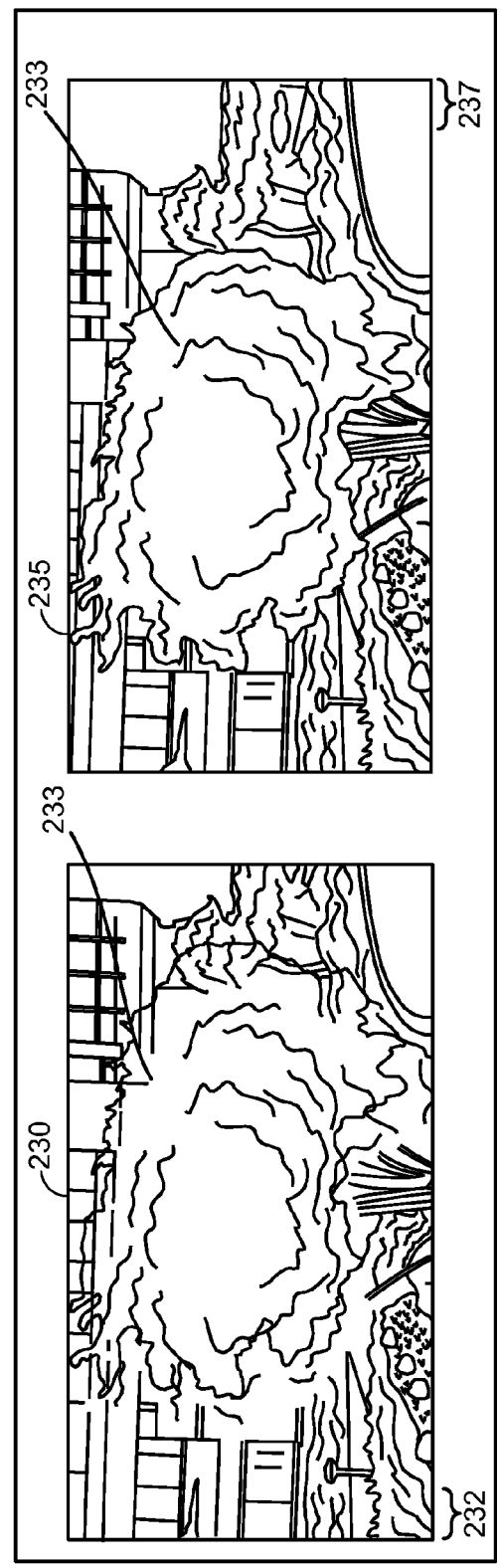

FIGS. 2A and 2B illustrate the stereoscopic image pair from FIG. 1, now represented as images 220 and 225 after the rotation of image 105 in FIG. 1 has been corrected. As can be observed, image 225 has been rotated counterclockwise relative to image 105 of FIG. 1 so as to better align with image 220. However, FIG. 2A shows that significant vertical misalignment remains between the two images 220 and 225. To reduce this vertical misalignment, some embodiments may crop portions of image 220 and image 225. For example, the shaded regions 222 and 227 of each image 220 and 225 may be cropped from the original images. After this crop operation, the images may appear as images 230 and 235 in FIG. 2B. Note that the alignment of images 230 and 235 is improved as compared to the alignment of images 220 and 225.

Note also that each image 230 and 235 captures a slightly different portion of the scene due to the distance between each of the lenses used to capture the stereoscopic image pair. The differences in the images are shown by bracketed regions 232 and 237. The left image 230 captures a slightly more left perspective, including content above bracket 232, while the right image 235 captures a slightly more right perspective, including content above bracket 237. The relative horizontal position of objects in the first image, for example the tree 233 when compared to the relative horizontal position of the same object in the right image 138 contribute to the three dimensional effect provided by a stereoscopic image pair. This relative horizontal position of each object may also be adjusted to change the depth at which the object is perceived by a viewer. This adjustment is known as a convergence adjustment, as it adjusts the angle of sight of a viewer's eyes as the stereoscopic image pair is viewed.

Figure 3:
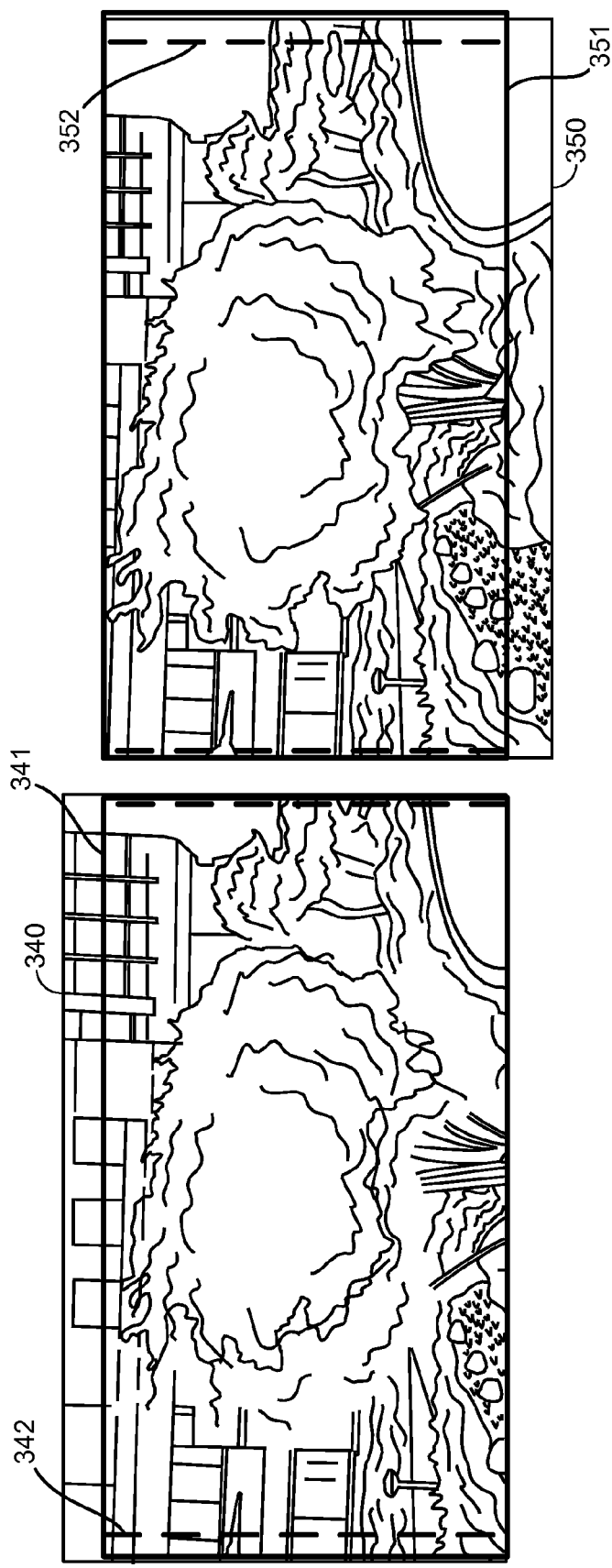
FIG. 3 is a stereoscopic image pair and illustrates how image data may be lost when aligning and adjusting the convergence point of the images of the stereoscopic image pair.

FIG. 3 illustrates how image data may be lost when aligning and adjusting the convergence point of the images of a stereoscopic image pair. Rectangles 341 and 351 illustrate the portion of each image 340 and 350 that remain after an example crop operation is performed to vertically align the two images. Rectangles 342 and 352 illustrate the portion of each image remaining after an example operation to adjust the convergence point of images 340 and 350 is performed. To maintain adequate image quality, the amount of image area outside rectangles 342 and 352 in each dimension should not exceed a defined crop budget for that dimension.

However, in certain imaging environments, the total crop budget available for cropping images is insufficient to both set the desired point of convergence and align the images with each other, while still maintaining the viewable area necessary for a high quality stereoscopic image pair. Thus, embodiments disclosed herein provide improved alignment and convergence adjustment methods to enable a greater amount of image rectification and adjustment for convergence while utilizing the same or less of the available total crop budget.

One embodiment is an image processing method and apparatus that shifts or crops a first image in a stereoscopic image pair to produce a first aligned image that is aligned with a second image of the stereoscopic image pair. When the two images of a stereoscopic image pair are aligned, the relative positions of objects within the images correspond to the relative positions of the lens used to capture the images when those lenses are at proper mechanical calibration.

The embodiment may then further adjust the aligned stereoscopic image pair to a desired convergence point by first determining a target horizontal disparity between the aligned images necessary to provide for the desired convergence point. After a target horizontal disparity is determined, additional cropping of one or both images may be performed to effect the target horizontal disparity. However, since the viewable region of the first aligned image has been reduced as part of the alignment process, the cropping of an outside dimension of the first aligned image may be limited to preserve acceptable image quality of the stereoscopic image pair. Various limits are contemplated. In one embodiment, the additional cropping of the first aligned image may be limited to a percentage of the total horizontal resolution of the final image horizontal resolution. A final image horizontal resolution may be the horizontal image resolution of the images of a stereoscopic image pair after the images have been adjusted for alignment and convergence adjustment. A final image horizontal resolution may also be the horizontal resolution of each image of the stereoscopic image pair when displayed to a user. One embodiment may limit cropping performed to effect a convergence adjustment to between eight and twelve percent of the final horizontal resolution of an image.

By adjusting only the first image to align the first image with the second image, the second image may be adjusted more extensively when performing a convergence adjustment between the first aligned image and the second image than would have otherwise been possible if the second image had also been cropped to effect the alignment. This method provides for greater tolerances in misalignments between images of a stereoscopic image pair when also adjusting for a convergence point, while maintaining satisfactory viewable regions for the stereoscopic image pair. Alternatively convergence points between the two images may be made much closer than would normally be achievable using traditional methods.

Figure 4:
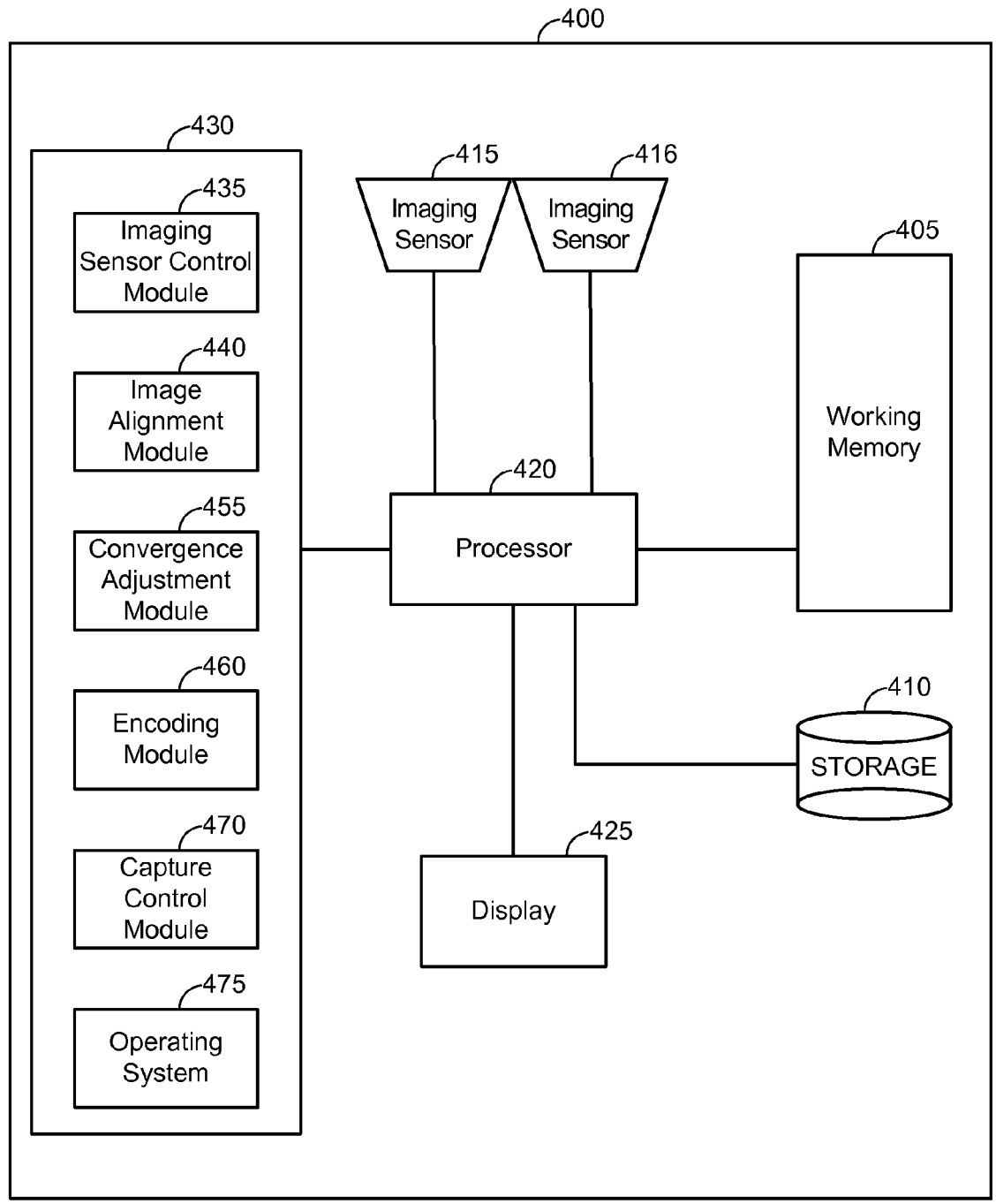
FIG. 4 is a block diagram depicting a device implementing some operative embodiments. The major components of a mobile device are illustrated.

FIG. 4 depicts a high-level block diagram of a device 400 having a set of components including a processor 420 operatively coupled to imaging sensors 415 and 416. A working memory 405, storage 410, electronic display 425, and memory 430 are also in communication with and operatively coupled to the processor 420.

Device 400 may be a cell phone, digital camera, personal digital assistant, or the like. Device 400 may also be a more stationary device such as a desktop personal computer, video conferencing station, or the like. A plurality of applications may be available to the user on device 400. These applications may include traditional photographic applications, high dynamic range imaging, panoramic video, or stereoscopic imaging such as 3D images or 3D video.

Processor 420 may be a general purpose processing unit or a processor specially designed for imaging applications. As shown, the processor 420 is connected to a memory 430 and a working memory 405. In the illustrated embodiment, the memory 430 stores an imaging sensor control module 435, image alignment module 440, convergence adjustment module 455, encoding module 460, capture control module 470, and operating system 475. These modules include instructions that configure the processor to perform various image processing and device management tasks. Working memory 405 may be used by processor 420 to store a working set of processor instructions contained in the modules of memory 430. Alternatively, working memory 405 may also be used by processor 420 to store dynamic data created during the operation of device 400.

As mentioned above, the processor is configured by several modules stored in the memories. The imaging sensor control module 435 includes instructions that configure the processor 420 to adjust the focus position of imaging sensors 415 and 416. The imaging sensor control module 435 also includes instructions that configure the processor 420 to capture images with imaging sensors 415 and 416. Therefore, processor 420, along with image capture control module 435, imaging sensor 415 or 416, and working memory 405 represent one means for capturing an image using an imaging sensor. These components also represent one means for providing a first image and a second image that are part of a stereoscopic image pair. The image alignment module 440 provides instructions that configure the processor 420 to determine and possibly eliminate disparities in the x, y, and z axis between images captured by imaging sensors 415 and 416. Image alignment module 440 may also correct rotational misalignments around the x, y, and z axis between the two images. Convergence adjustment module 455 may include instructions that configure the processor 420 to adjust a convergence point between two images captured by imaging sensors 415 and 416. Adjusting the convergence point may include cropping the first or second images captured by imaging sensors 415 and 416 to achieve the desired convergence point between the two images. Therefore, instructions in the convergence adjustment module 455 represent one means for cropping the first or second images captured by imaging sensors 415 and 416. Alternatively, adjusting the convergence may include limiting the cropping of a first aligned image to a percent of a final horizontal image resolution when the horizontal disparity required to achieve the convergence point is greater than a convergence budget. Adjusting the convergence may include cropping the outside dimension of a second image more extensively than cropping of the outside dimension of a first aligned image. Therefore, instructions in the convergence adjustment module 455 represent one means for adjusting a first aligned image and a second image to obtain a desired convergence point by limiting the cropping of an outside dimension of the first aligned image to a percent of a final image horizontal resolution when the target horizontal image disparity is greater than the percent of the final image horizontal resolution. Encoding module 460 includes instructions that configure the processor to encode images captured by imaging sensor 415 and 416 into a stereoscopic image. Therefore, instructions contained within encoding module 460 represent one means for generating a stereoscopic image based on a first image and a second image.

Capture control module 470 includes instructions that control the overall image processing functions of device 400. For example, capture control module 470 may include instructions that call subroutines in imaging control module 435 in order to configure the processor 420 to capture a first and second image using the imaging sensors 415 or 416. Capture control module 470 may then call image alignment module 440 to reduce or eliminate misalignment between the two images in the x, y, or z axis. Capture control module may then invoke convergence adjustment module 455 to adjust the convergence point between the two images captured by imaging sensor 415 or imaging sensor 416. Capture control module 470 may then call encoding module 460 to encode two images captured by imaging sensor 415 and imaging sensor 416, and adjusted by the image alignment module 440, and further adjusted by the convergence adjustment module 455 into a stereoscopic image pair. In some embodiments, encoding module 460 or capture control module 470 may include instructions which configure the processor 420 to store a stereoscopic image pair to the data store 410.

Operating system module 475 configures the processor to manage the memory and processing resources of device 400. For example, operating system module 475 may include device drivers to manage hardware resources such as the electronic display 425, storage 410, or imaging sensor 415. Therefore, in some embodiments, instructions contained in the image processing modules discussed above may not interact with these hardware resources directly, but instead interact through standard subroutines or APIs located in operating system component 475. Instructions within operating system 475 may then interact directly with these hardware components.

Processor 420 may write data to storage module 410. While storage module 410 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

Although FIG. 4 illustrates a device with two imaging sensors, other embodiments of device 400 may include more than two imaging sensors, or only one imaging sensor. Such embodiments may also include image processing instructions so as to capture the two images discussed above from one imaging sensor but at different points in time.

Furthermore, FIG. 4 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 4 illustrates two memory components, to include memory component 430 having several modules, and a separate memory 405 having a working memory, one with skill in the art would recognize several embodiments utilizing different memory architectures. For example, a design may utilize ROM or static RAM memory for the storage of processor instructions implementing the modules contained in memory 430. Alternatively, processor instructions may be read at system startup from a disk storage device that is integrated into device 400 or connected via an external device port. The processor instructions may then be loaded into RAM to facilitate execution by the processor. For example, working memory 405 may be a RAM memory, with instructions loaded into working memory 405 before execution by the processor 420.

Figure 5:
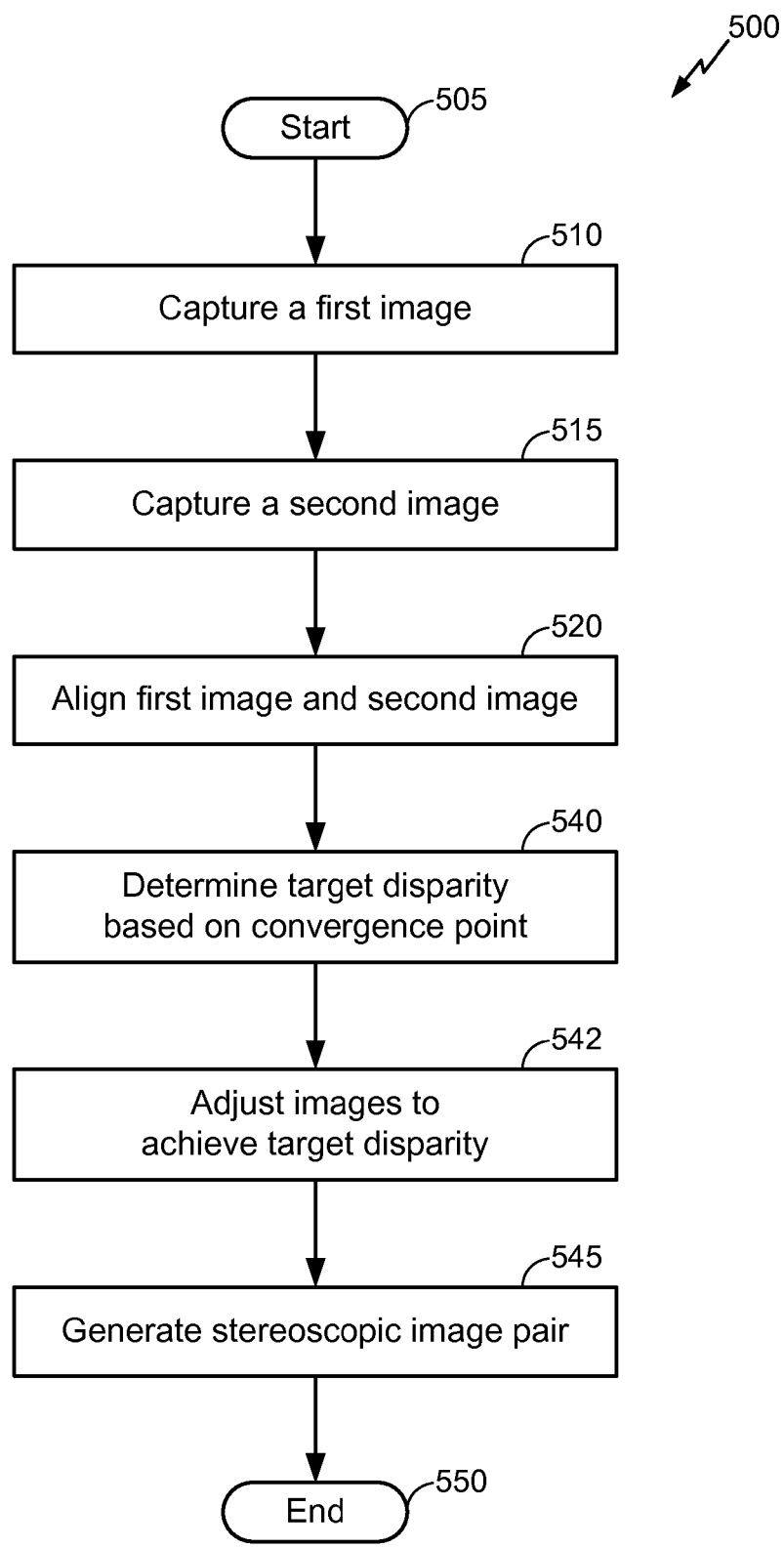
FIG. 5 is a flow chart depicting a process utilized in one embodiment of a capture control module.

FIG. 5 is a flow chart illustrating a process 500 that runs within one embodiment of the capture control module 470 of FIG. 4. Process 500 may be used in some embodiments to align the two images of a stereoscopic image pair and adjust the convergence point between the two images. The process 500 begins at start block 505 and then transitions to block 510 where a first image of the stereoscopic image pair is captured. The first image may be captured by instructions in capture control module 470 calling subroutines inside imaging sensor control module 435. Imaging sensor control module 435 may then configure the processor to control imaging sensor 415 or 416, possibly via operating system module 475, to capture an image. Process 500 then moves to block 515 where a second image of the stereoscopic image pair is captured by one of the image sensors. Process 500 then moves to block 520 where instructions align the first image and the second image of the stereoscopic image pair. Alignment of the two images may include shifting or cropping of only one image of the stereoscopic image pair in order to correct misalignments about an x, y, or z axis. Misalignment in rotation about a x, y, or z axis may also be corrected by rotating or geometrically correcting only one or both images. Alignment of the images may be performed by instructions contained in the image alignment module 540, illustrated in FIG. 4. These instructions represent one means for shifting or cropping a first image to create a first aligned image that is aligned with a second image.

After the images have been aligned, process 500 moves to block 540. Depending on the imaging environment used to capture the stereoscopic image pair, and the goals of the photographer, there may be a need to adjust the convergence point of the images of the stereoscopic image pair. Based on a desired convergence point, a target horizontal disparity between the two images of the stereoscopic image pair may be determined. A target horizontal disparity represents the amount of horizontal shift, in pixels, required between the two images of a stereoscopic image pair to achieve the desired convergence point. For example, a target horizontal disparity based on a convergence point may be determined by Equation (1) below in some embodiments:

$$\text{Disparity} = B * f / \text{Depth} \quad (1)$$

Where:
B is a camera baseline (a distance between two lenses)
f is a focal length in pixels
Depth is a depth of the closest object in the two images of the stereoscopic image pair As seen in Equation #1, the target horizontal image disparity may be determined at least based on several parameters. For example, the length of the camera baseline may be considered. The camera baseline is the distance between two lenses used to capture the two images. Additionally, the size of the display screen of device 400, if so equipped, or the size of an external display screen if device 400 is configured to display the stereoscopic image pair on an external display may also be considered. The typical viewing distance of the stereoscopic image pair may also be considered. A combination of these attributes may also be considered to calculate a disparity between a first and second image that will result in a stereoscopic image that has the desired convergence point. Block 540 may be performed by instructions contained in the convergence adjustment module 455 or the capture control module 470 of device 400, illustrated in FIG. 4. Instructions in these modules represent one means for determining a horizontal image disparity based on a desired convergence point.

After a target horizontal disparity is determined in block 540, process 500 moves to block 542, where the first image and the second image are adjusted to achieve the target horizontal disparity and therefore obtain the desired convergence point. For example, block 542 may crop the outside dimensions of one or both images of the stereoscopic image pair to horizontally shift the relative position of objects within each image. One particular embodiment of block 542 is described further in FIG. 6 below. Block 542 may be implemented by instructions included in the convergence adjustment module 455, illustrated in FIG. 4.

Once the appropriate adjustments have been applied, process 500 moves to block 545 where a stereoscopic image pair is generated based on images adjusted in block 542. In one embodiment, block 545 may be performed by instructions in encoding module 460. Therefore, instructions in encoding module 460 represent one means for generating a stereoscopic image pair. The original first and second images may also be used. Process 500 then transitions to end state 550.

Figure 6:
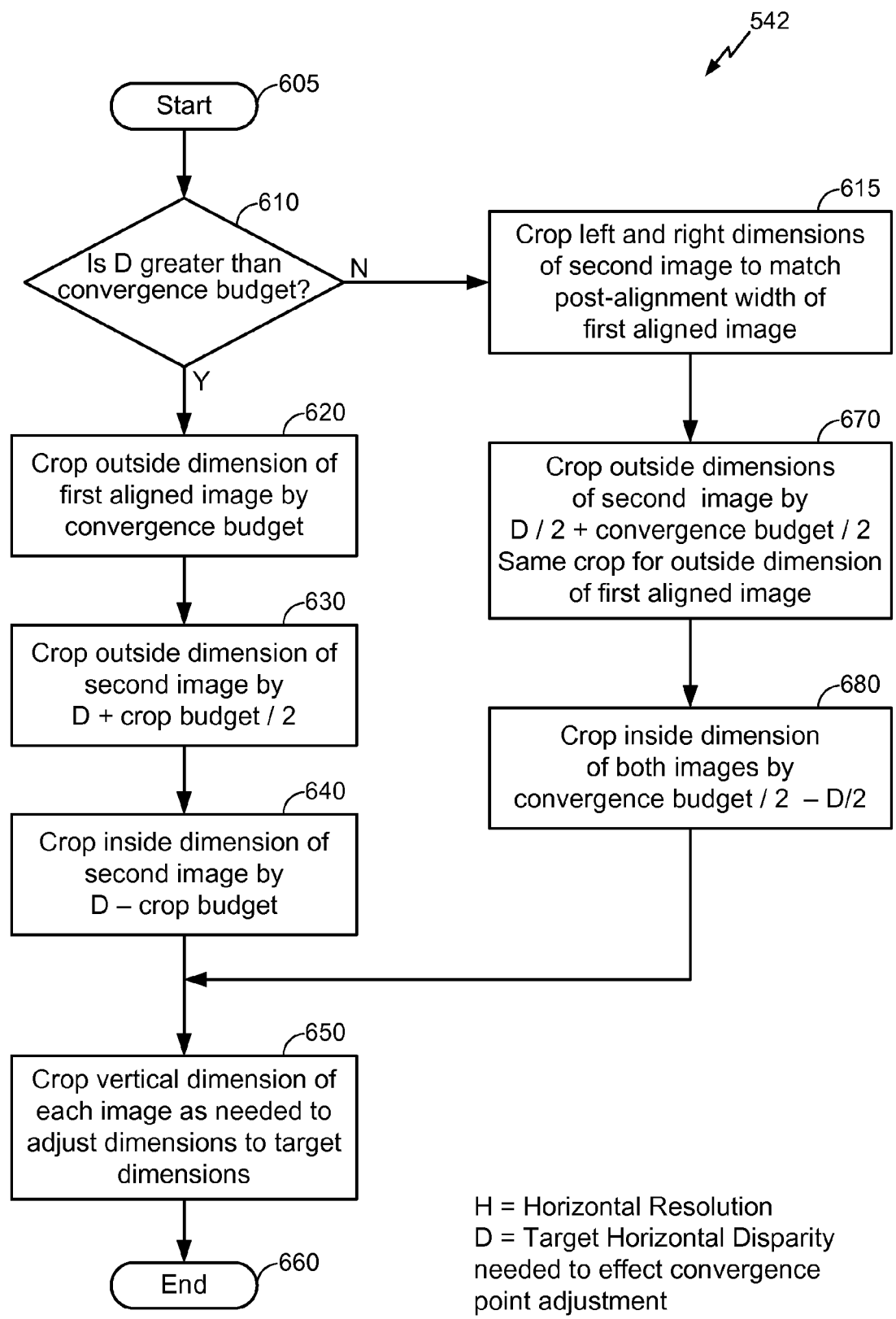
FIG. 6 is a flow chart illustrating one operative embodiment of a process for adjusting the convergence point of a stereoscopic image pair.

FIG. 6 is a flowchart illustrating one embodiment of a method of adjusting a stereoscopic image pair as may be implemented in block 542 of FIG. 5. In an embodiment, process 542 may be implemented by instructions included in the convergence adjustment module 455, illustrated in FIG. 4. Process 542 begins at start block 605 and then moves to decision block 610, where the target horizontal disparity (D) needed to adjust the two images to a desired convergence point is compared to a convergence budget.

Process 542 references a convergence budget and a crop budget. In an embodiment, the crop budget of FIG. 6 may be a maximum percent of a first image's dimension that will be cropped to align the first image with a second image of the stereoscopic image pair. Some embodiments may include a crop budget for both the horizontal and vertical dimensions of an image. The crop budgets may be the same or different for each dimension of the images of the stereoscopic image pair. In an embodiment, a convergence budget may be a maximum percent of an image's horizontal resolution that can be cropped to perform a convergence adjustment. Because convergence adjustment is generally performed in the horizontal dimension, there may be no convergence budget for a vertical dimension. In some embodiments, the convergence budget may be six, seven, eight, nine, or ten percent of a horizontal image resolution. In some embodiments, the crop budget and the convergence budget may be equivalent. In some implementations, the crop budget may be larger than the convergence budget.

Crop and convergence budgets may be represented in some implementations by a number of pixels in a particular dimension. Other implementations may represent these budgets in terms of a percent of a particular dimension. With either representation, the methods disclosed are equivalent. For example, a convergence budget of 10% of horizontal resolution may represent 115 pixels horizontally for an image 1152 pixels wide.

To adjust a convergence point between two images, it may be necessary to "vertically" crop outside dimensions of each image in the stereoscopic image pair. An outside dimension of a first image of a stereoscopic image is a dimension that bounds image data that does not overlap with image data of a second image of the stereoscopic image pair. In other words, an outside dimension of an image may form a border of a stereoscopic image pair when the stereoscopic image is viewed by a viewer. An inside dimension of a first image of a stereoscopic image is a dimension that bounds image data that may overlap with image data of a second image of the stereoscopic image pair. An inside dimension of an image is opposite an outside dimension of the image. Since a vertical crop operation typically removes all pixels within a particular "column" of an image, a convergence budget of ten percent (10%) of horizontal resolution may allow the loss of 10% of the total image area for convergence adjustment.

If a determination is made at the decision block 610 that the target horizontal disparity required is not greater than the convergence budget, process 542 moves to block 615.

In block 615, the second image is cropped on each side to match the horizontal width of the first image after alignment, also known as the first aligned image. After the second image has been cropped, process 542 moves to block 670, where the outside dimensions of the first aligned and second images are cropped by a width of one half the target horizontal disparity. Since the target horizontal disparity may represent the amount the images should be shifted away from each other in pixels, one half of the target horizontal disparity in pixels is cropped from the outside dimensions of the each image. The outside dimension of each image is further vertically cropped by a width of one half the convergence budget. Process 542 then moves to block 680 where the inside dimensions of each image are vertically cropped by a width of one half the convergence budget minus one half the disparity. Process 542 then moves to block 650.

If the amount of horizontal disparity (D) required to adjust the images to the desired convergence point is greater than the convergence budget at decision block 610, process 542 moves to block 620, where a vertical crop of the outside dimension of the first aligned image is limited to a width equivalent to the convergence budget. In some aspects, a vertical crop of the outside dimension of the first aligned image is limited to a maximum of between eight and twelve percent of the horizontal resolution of the target or final image size. Other limits are also contemplated. For example, an embodiment may limit cropping of the first aligned image to eight percent of the horizontal resolution of the target or final image. Process 542 then moves to block 630, where the second image is cropped on its outside dimension by the target horizontal disparity (D) and one half the crop budget. Process 542 then moves to block 640 where the inside dimension of the second image is further cropped by the target horizontal disparity (D) minus the crop budget.

Process 542 then moves to block 650, where the two images may be adjusted to set their vertical dimensions as needed for display. This may include horizontal cropping of the first aligned or second images. Process 542 then moves to end block 660.

Figure 7:
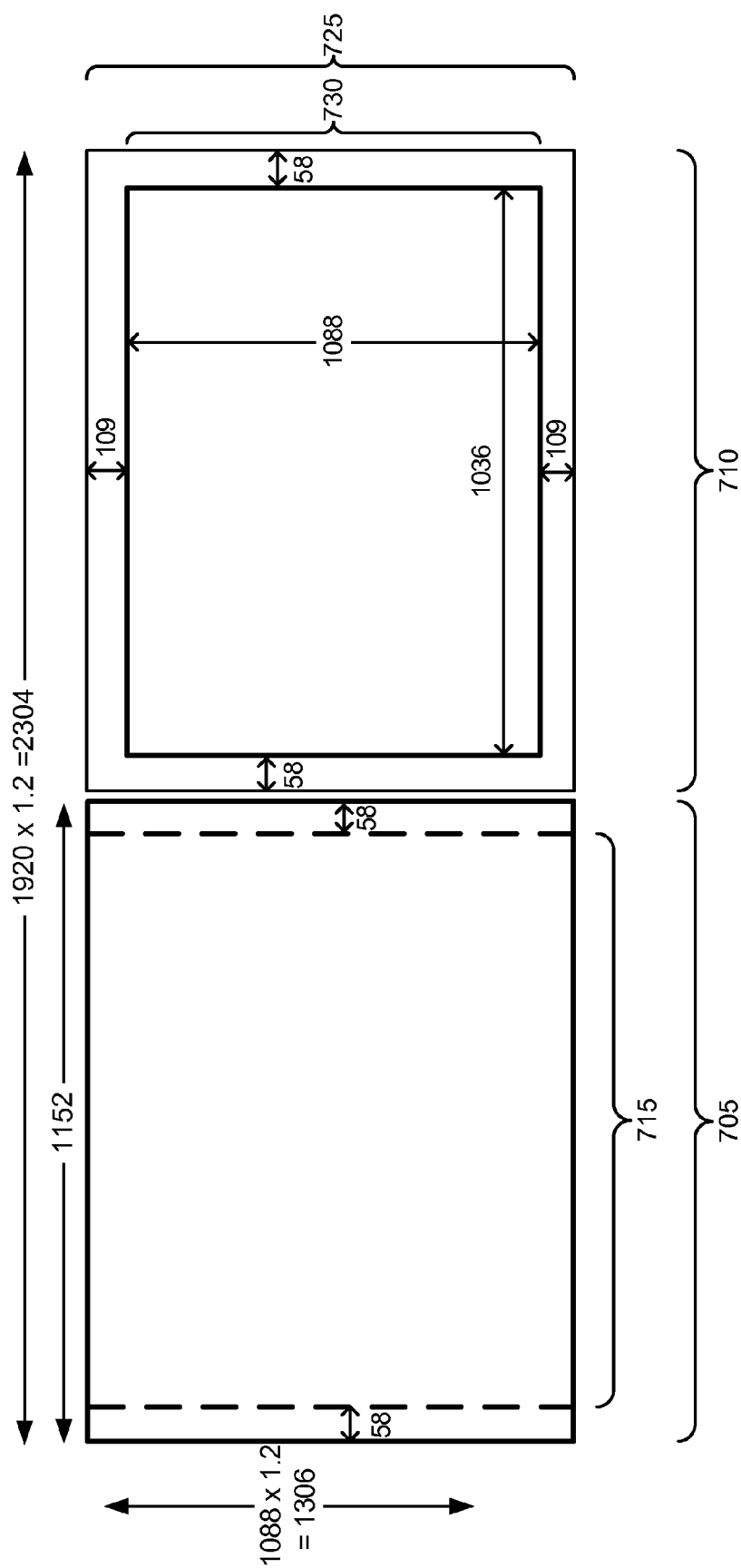
FIG. 7 illustrates one embodiment of a crop operation on a stereoscopic image pair. The crop operations are performed to align the two images.

FIG. 7 illustrates the results of an example image alignment process as implemented by block 520 of FIG. 5. For purposes of this example, it is assumed that 10% of the horizontal resolution of the original image data was cropped to align the images. For example, while the original horizontal dimension 705 of the right image was 1152 pixels, 10% of those pixels (115 pixels) have been cropped by removal of 58 pixels from each side of the image (58*2=116 with rounding error) to produce an image with horizontal dimension 715. The vertical dimension of the right image 725 was originally 1306 pixels, however, 109 pixels have been cropped from the top and bottom of the right image to align the images vertically and form vertical dimension 730.

Note that although the right image has been cropped to align the images, the left image retains its original dimensions. This method facilitates the convergence adjustment operation which may be performed after the images are aligned.

Figure 8:
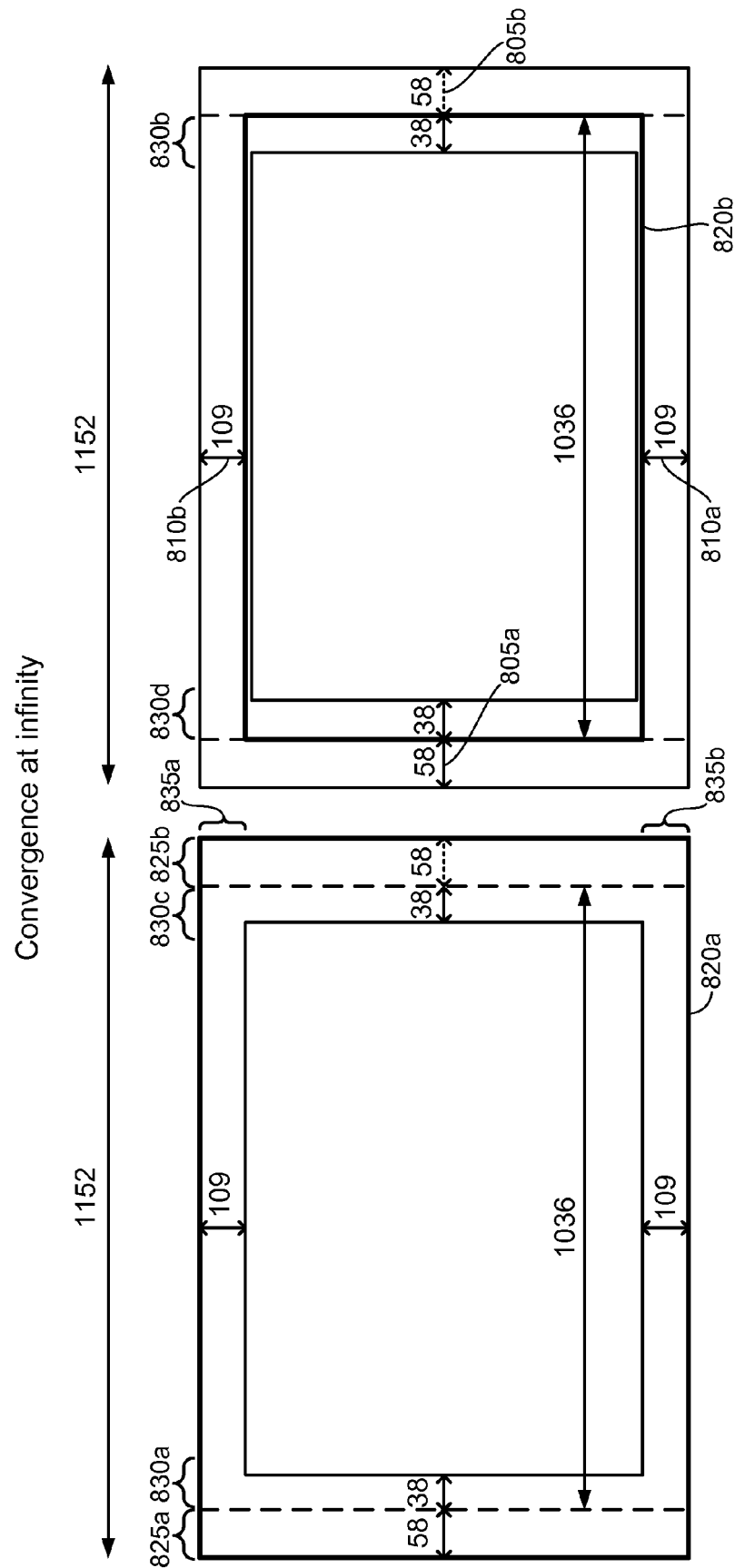
FIG. 8 illustrates crop operations on a stereoscopic image pair setting the convergence point to infinity, and implemented by one operative embodiment of the disclosed methods and apparatus.
Figure 9:
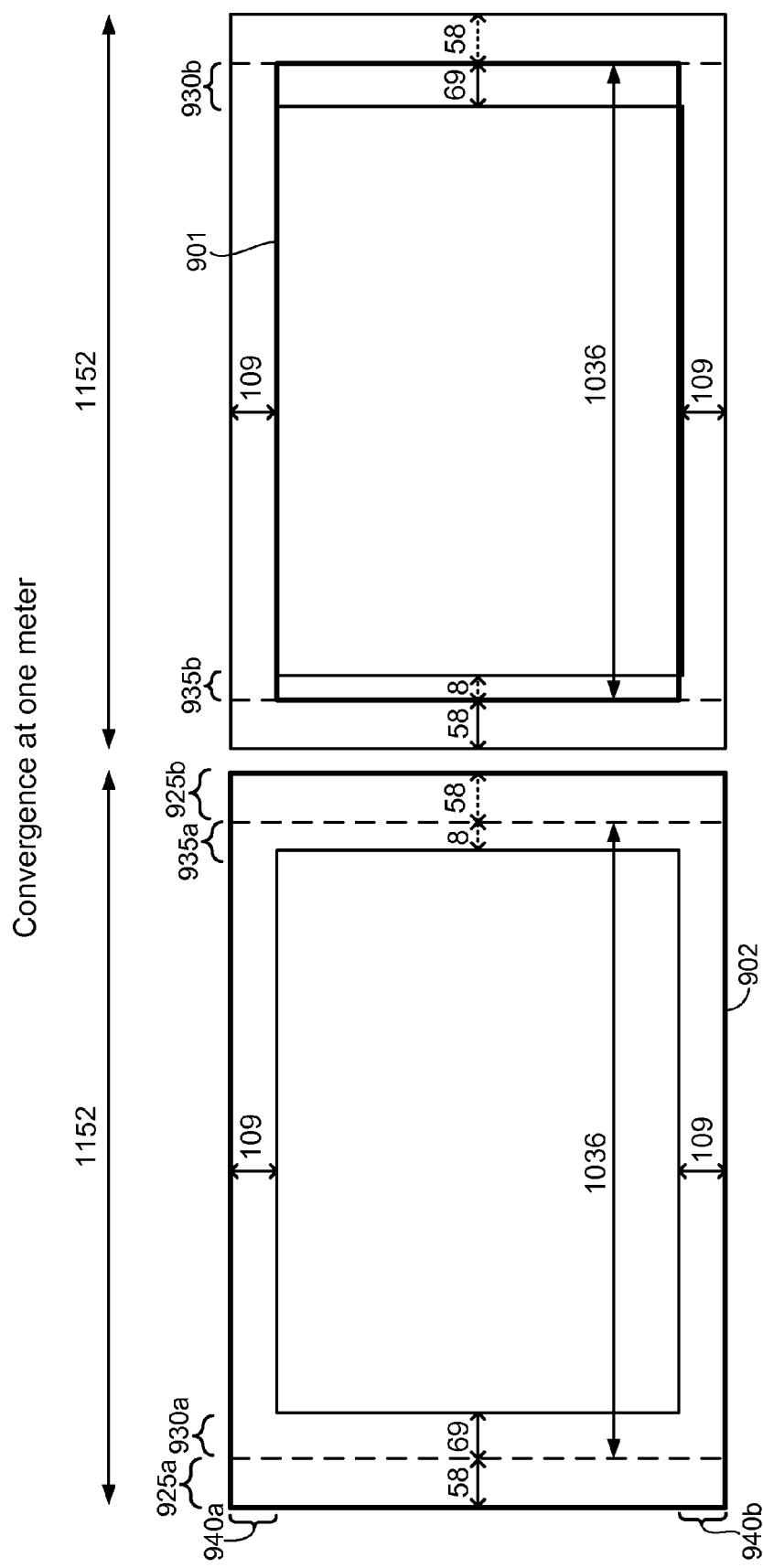
FIG. 9 illustrates crop operations on a stereoscopic image pair setting the convergence point to one meter, and implemented by one operative embodiment of the disclosed methods and apparatus.
Figure 10:
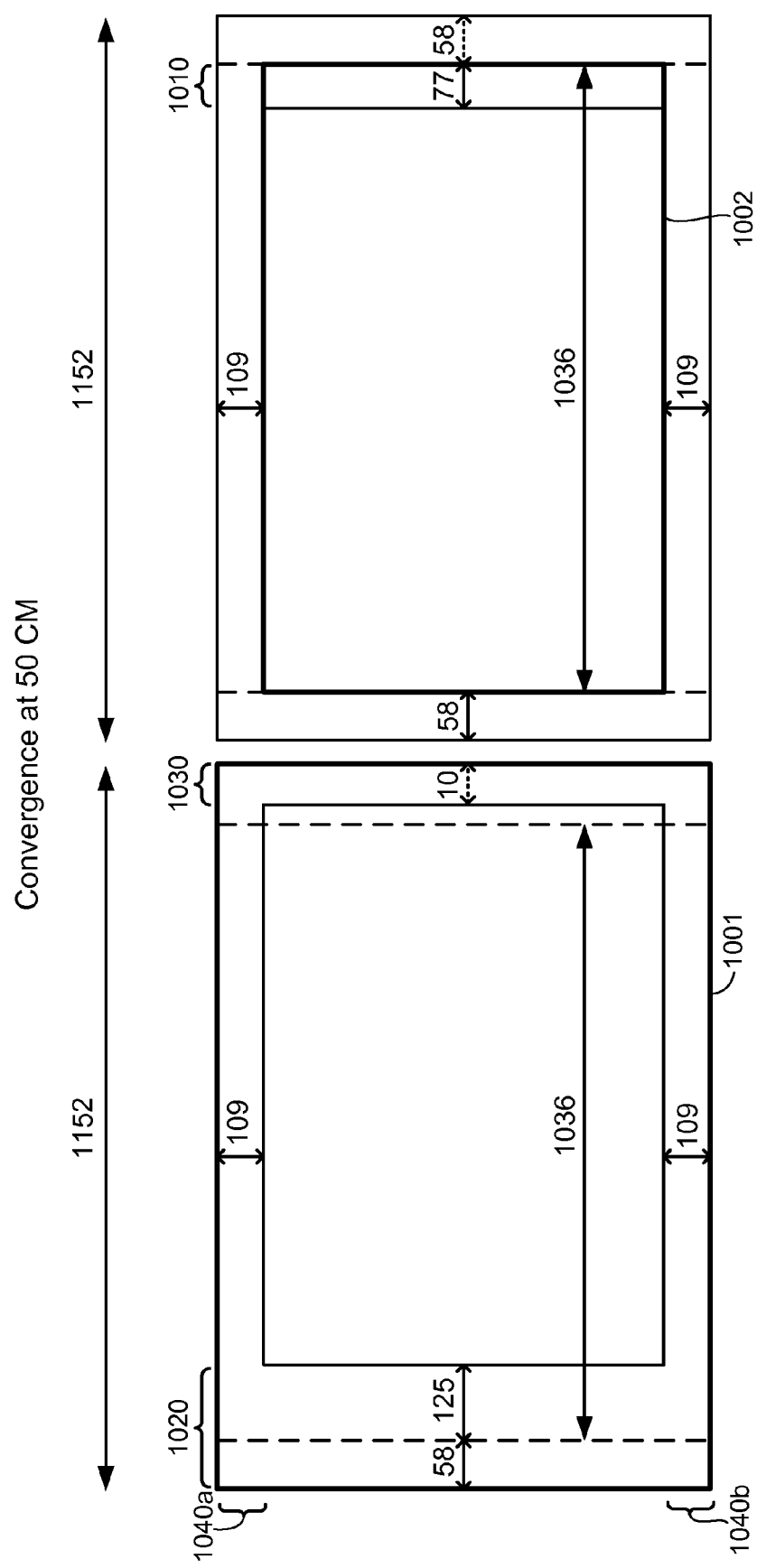
FIG. 10 illustrates crop operations on a stereoscopic image pair setting the convergence point to 50 centimeters, and implemented by one operative embodiment of the disclosed methods and apparatus.

FIGS. 8-10 illustrate examples of a convergence point adjustment processes utilizing process 542 of FIG. 5 and FIG. 6. These adjustment processes may occur after an image alignment process, such as that of block 520 of FIG. 5 and demonstrated in FIG. 7. The examples of FIGS. 8-10 include assumptions to simplify the explanation. For example, in the examples, the disparity needed to achieve a convergence point is determined by Equation (1) above.

FIG. 8 illustrates a convergence point of infinity, so no change in horizontal disparity is necessary because, in the illustrated embodiment, the optical axes of the two lenses used to capture the two images are parallel. In the illustrated embodiment of FIG. 8, the right image has been cropped by a previous image rectification process. As illustrated in FIG. 7, 58 pixels 805*a-b* were removed from each horizontal side of the right image, while 109 pixels 810*a-b* were removed from the top and bottom of the right image in order to align the left and right images. Note that a left image size or resolution is retained before and after the left and right images are aligned. Thus, the size of the images after image alignment is shown by bold rectangles 820*a-b*.

To effect a convergence adjustment, first a target horizontal disparity is determined. Because the convergence point is infinity, the target horizontal disparity is zero pixels. The zero pixels of disparity will then be compared to the convergence budget, as in block 610 of process 542. In the embodiment of FIG. 8, we assume the convergence budget is eight percent of the target horizontal resolution. Since the target horizontal resolution of the illustrated images is 960 pixels, it's clear that the 0 pixels of disparity is less than 8% of 960 (76.8 pixels).

As in block 615 of process 542, the unaligned image, or left image in the example of FIG. 8, is cropped in the inside and outside dimensions to match the size of the previously aligned or right image after rectification. In this case, both the left and right side of the left image are cropped by 58 pixels as shown by 825*a-b*. Since the disparity is zero, no pixels are cropped to effect a change in the horizontal disparity. However, the outside dimensions of the left and right images are cropped by one half the convergence budget. In this case, because the illustrated embodiment uses a convergence budget of eight percent of target horizontal resolution, the convergence budget is 960*0.08=77 pixels. Thus, both images are cropped 77/2=38 pixels from their outside dimensions as shown by 830*a* and 830*b*. Next the inside dimensions of the left and right images are also adjusted to meet the target dimensions. As mentioned, the convergence budget was determined to be 77 pixels, so the inside dimensions are cropped by 77/2−0 or 38 pixels, as shown by 830*b* and 830*d*. The vertical dimensions of the left and right images are then adjusted as needed. In the illustrated embodiment, the left image is cropped 109 pixels on the top and bottom to match the dimensions of the right image as shown by 835*a-b*.

FIG. 9 illustrates another example of a convergence point adjustment process. FIG. 9 assumes a convergence point of one meter. As with FIG. 7, the bold rectangles 901 and 902 indicate the size of the images after the images are aligned. In the illustrated embodiment, only the right image 901 was cropped to align the two images 901 and 902. With a convergence point of one meter, per equation (1) above, the target horizontal disparity is 3.25*1920/1000 cm or ~62 pixels. Next, as in block 610 of FIG. 6, the disparity is compared to the convergence budget, in this case, eight percent of the final horizontal resolution of 960 or 77 pixels. Because the disparity is less than the convergence budget, consistent with block 615 of FIG. 6, the left and right dimensions of the left image are cropped to match the post-alignment width of the right image as described by block 615 above. In this case, 58 pixels are cropped from the left and right side of the left image, as shown by 925*a-b*. Next, consistent with block 670 of FIG. 6, the outside dimensions of each image are cropped by one half the disparity or 31 pixels. The outside dimensions are cropped an additional amount of one half the convergence budget. Similar to the description of FIG. 8, the convergence budget is 77 pixels, so the outside dimensions of each image are cropped an addition 38 pixels for a total of 69 pixels. The 31 pixels, representing one half the disparity, plus the 38 pixels, representing one half the disparity, is shown by 930*a-b*. Next, as described by block 680 of FIG. 6, the inside dimensions are cropped by one half the convergence budget minus one half the disparity. In this example, because our convergence budget is eight percent of target horizontal image resolution, the inside dimensions of each image are cropped 77/2−62/2=8 additional pixels. This is shown as 935*a-b*. The left image is also cropped 109 pixels on each vertical dimension to match the vertical dimension of the right image after alignment, as shown by 940*a-b*.

FIG. 10 illustrates another example of a convergence point adjustment process, where the convergence point is set to 50 centimeters. As with FIG. 8 and FIG. 9, the bold rectangles 1001 and 1002 indicate the size of the images after the images are aligned. In the illustrated embodiment, only the right image 1002 was cropped to align the two images 1001 and 1002. To adjust the convergence point, the target horizontal disparity based on the convergence point may be determined. Using Equation (1) above, a convergence point of 50 centimeters provides a disparity of 3.25*1920/50 cm or 124.8 pixels. Consistent with block 610 of FIG. 6, the disparity of 124.8 pixels is compared to the convergence budget, which in the illustrated embodiment is eight percent of the horizontal resolution or 77 pixels.

Since the target disparity is greater than the convergence budget (in the illustrated embodiment, eight percent of the target horizontal resolution), block 620 of FIG. 6 indicates that cropping of the outside dimension of the right image is limited to a maximum of eight percent of the target horizontal resolution or the convergence budget. In the example of FIG. 10, this is 77 pixels, as shown by 1010. Consistent with block 630 of FIG. 6, the outside dimension of the unmodified left image is then cropped by the disparity (125 pixels) and one half the crop budget. Since the crop budget is ten percent of the starting horizontal image resolution in the illustrated embodiment, the crop budget is 10% of 1152, or 115 pixels. Five percent of 1152 pixels is ~58 pixels, resulting in the outside dimension of the left unmodified image 1001 being cropped by 125+58=183 pixels, as shown by 1020. Consistent with block 640 of FIG. 6, the inside dimension of the left image is cropped by the disparity minus the crop budget. The crop budget in this example is ten percent of the horizontal image resolution of 1152 pixels, or 115 pixels. Since the disparity as described above is 124.8 pixels, the left image is cropped on the right by 125−115 or 10 pixels as shown by 1030. The vertical dimensions of each image may be adjusted as needed. In this case, 109 pixels are cropped from the top and bottom of the left image to match the vertical dimension of the right image, as shown by 1040*a-b*.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method of storing a stereoscopic image pair having a convergence point, the convergence point determining a depth of an object in the stereoscopic image pair, comprising:
    capturing a first image of a stereoscopic image pair with a first imaging sensor of an imaging device;
    capturing a second image of the stereoscopic image pair with a different second imaging sensor of the imaging device;
    shifting or cropping the first image to align the first and second images, while preserving the second image;
    determining a target horizontal image disparity between the first aligned image and the second image that provides the convergence point for the stereoscopic image pair;
    in response to the target horizontal image disparity being equal to or below a threshold, cropping the first aligned image and second image equally to obtain the convergence point,
    otherwise, to obtain the convergence point in response to the target horizontal image disparity exceeding the threshold:
        cropping an outside dimension of the first aligned image by the threshold,
        cropping an outside dimension of the second image by the target horizontal image disparity and one half the threshold, and cropping an inside dimension of the second image by the target horizontal image disparity minus the threshold;
and
electronically storing the stereoscopic image pair including the cropped images derived from the adjusted first aligned and second images to a data storage.

2. The method of claim 1, further comprising adjusting the first aligned image and the second image by preserving the inside dimension of the first aligned image when the target horizontal image disparity is greater than the percent of the final image horizontal resolution.

3. The method of claim 2, further comprising adjusting the first aligned image and the second image by cropping only the second image to effect the target horizontal disparity between the first aligned image and the second image.

4. The method of claim 1, further comprising cropping the outside dimensions of the first aligned and second images by at least one half the target horizontal image disparity when the target horizontal image disparity is less than or equal to the predetermined threshold.

5. The method of claim 3, wherein the outside dimension of the second image is cropped by at least the target horizontal image disparity when the target horizontal image disparity is greater than the predetermined threshold.

6. The method of claim 1, further comprising cropping at least one image derived from the first image or the second image to achieve a target dimension.

7. The method of claim 1, further comprising capturing the first image through a first image sensor and capturing the second image through a second image sensor.

8. The method of claim 1, further comprising displaying an image derived from the first aligned image or the second image with the final image horizontal resolution on an electronic display.

9. The method of claim 1, wherein the aligning of the first image and the second image includes geometrically rotating the first image.

10. The method of claim 1, further comprising storing the first aligned image and second image to a data store.

11. The method of claim 1, wherein the percent is eight percent.

12. An imaging device for adjusting the convergence point of a stereoscopic image pair, wherein the convergence point determines a depth of an object in stereoscopic image resulting from the stereoscopic image pair, comprising:
a first image sensor configured to capture a first image of a stereoscopic image pair;
a different second image sensor configured to capture a second image of a stereoscopic image pair;
an electronic hardware processor, coupled to the first imaging sensor and the second imaging sensor; and
an electronic hardware memory, coupled to the electronic processor, and storing:
a control module configured to:
shift or crop the first image to align the first and second image, while preserving the second image,
determine a target horizontal image disparity that provides the convergence point of the stereoscopic image pair,
in response to the target horizontal image disparity being equal to or below a threshold, cropping the first aligned image and second image equally to obtain the convergence point,
otherwise, to obtain the convergence point in response to the target horizontal image disparity exceeding the threshold:
cropping an outside dimension of the first aligned image by the threshold,
cropping an outside dimension of the second image by the target horizontal image disparity and one half the threshold, and
cropping an inside dimension of the second image by the target horizontal image disparity minus the threshold;
and
an encoding module, configured to electronically store the stereoscopic image pair including the cropped first aligned image and cropped second image to a data store.

13. The apparatus of claim 12, wherein the control module is further configured to adjust the stereoscopic image pair by preserving the inside dimension of the first image when the target horizontal image disparity is greater than the predetermined threshold.

14. The apparatus of claim 13, wherein the control module is further configured to adjust the stereoscopic image pair by cropping the second image to effect the target horizontal disparity between the second image and the first image.

15. The apparatus of claim 12, wherein the control module is further configured to crop the outside dimensions of the first and second images by at least one half the target horizontal image disparity when the target horizontal image disparity is less than or equal to the predetermined threshold.

16. The apparatus of claim 14, wherein the outside dimension of the second image is cropped by at least the target horizontal image disparity when the target horizontal image disparity is greater than the predetermined threshold.

17. The apparatus of claim 12, wherein the control module is further configured to crop at least one image derived from the second image or the first image to achieve a target dimension.

18. The apparatus of claim 12, wherein the aligning of the first image and the second image includes geometrically rotating the first image.

19. The apparatus of claim 12, wherein the control module is further configured to store a stereoscopic image pair derived from the first image and the second image to a data store.

20. The apparatus of claim 12, wherein the predetermined threshold is eight percent of the horizontal image resolution.

21. The apparatus of claim 12, further comprising a wireless telephone handset.

22. A non-transitory, computer readable medium, comprising instructions that when executed by a processor, cause the processor to perform a method of adjusting a convergence point of a stereoscopic image pair, wherein the convergence point determines a depth of an object perceived by a viewer when viewing a stereoscopic image resulting from the stereoscopic image pair, the method comprising:
capturing a first image of a stereoscopic image pair with a first image sensor of an imaging device;
capturing a second image of the stereoscopic image pair with a second image sensor of the imaging device;
shifting or cropping the first image to align the first and the second image, while preserving the second image;
determining a target horizontal image disparity that provides the convergence point of the stereoscopic image pair;
in response to the target horizontal image disparity being equal to or below a threshold, cropping the first aligned image and second image equally to obtain the convergence point, otherwise, to obtain the convergence point in response to the target horizontal image disparity exceeding the threshold:
  cropping an outside dimension of the first aligned image by the threshold,
  cropping an outside dimension of the second image by the target horizontal image disparity and one half the threshold, and
  cropping an inside dimension of the second image by the target horizontal image disparity minus the threshold;
and
electronically storing the adjusted stereoscopic image pair including the cropped first aligned image and cropped second image to a data storage.

* * * * *